UNITED STATES PATENT OFFICE.

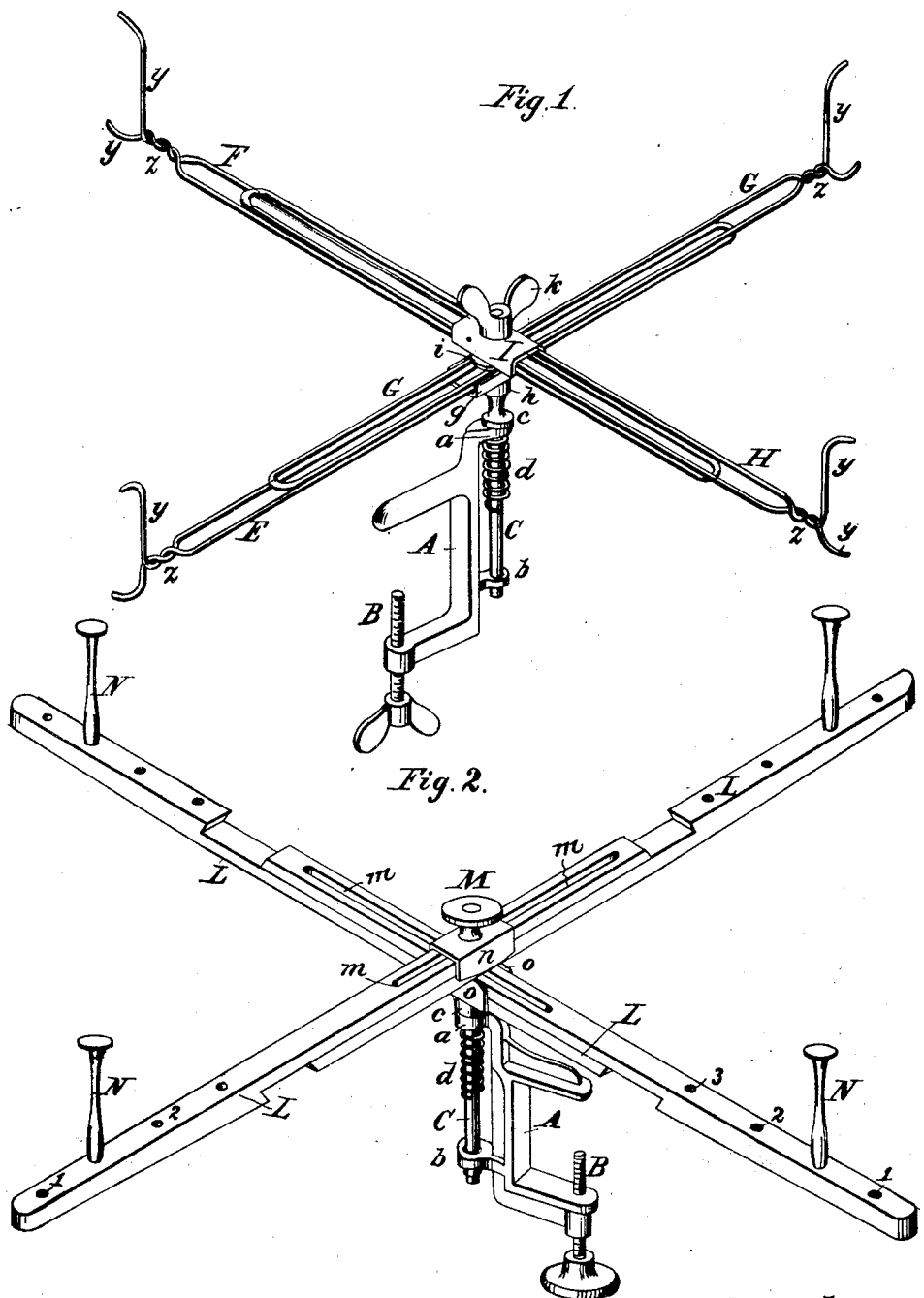

SIDNEY W. PALMER AND JOSIAH F. PALMER, OF AUBURN, NEW YORK.

SILK OR THREAD REEL.

Specification of Letters Patent No. 28,297, dated May 15, 1860.

*To all whom it may concern:*

Be it known that we, SIDNEY W. PALMER and JOSIAH F. PALMER, of Auburn, in the county of Cayuga and State of New York, have invented certain new and useful Improvements in Reels for Spooling Silk and other Threads, which we term "Palmer's Extension Silk and Thread Reel;" and we do hereby declare that the following is a full, clear, and exact description of the construction and operation of the same, reference being had to the accompanying drawings, making a part of this specification, in which—

Figure 1 represents a perspective view of said reel the arms of which are made of wire. Fig. 2 represents a perspective view of said reel when the arms are made of wood.

Our invention relates to the manner of securing the horizontal reel arms of a silk reel to the spindle on which they turn, so that said arms can, not only be extended and contracted at pleasure when the apparatus is to be used, but also that they can be turned parallel to each other and folded up when the apparatus is to be laid aside.

To enable others skilled in the art to make and use our invention we will proceed to describe its construction and operation.

In Fig. 1, A, represents a clamp which can be secured to a table by means of the clamping screw B.

C, represents a spindle which is hung in the lugs, *a*, and, *b* of the clamp A, so as to rest with its collar, *c*, on the bracket, *a*. The spindle, C, is prevented from being lifted out of its bearings by a spiral spring, *d*, the lower end of which is secured to the spindle, C, while its upper end bears against the lower side of the lug, *a*, *q*, represents a horizontal clamp plate which is slipped over the spindle, C, and which is supported by the shoulder, *h*, on said spindle, it serves to support and hold the two lower reel arms, E, and, G. These reel arms when made of wire are bent in the manner represented in Fig. 1, each arm being made of one piece of wire only, and bent so as to pass on each side of the spindle, C, while the ends are twisted together as represented at, *h*, and bent up into prongs or forks *y*, so as to form projections that will conveniently receive and hold one or more skeins of thread.

F, and H, represent two other such reel arms which are set on the spindle C, and which are separated from the former reel arms by the washer, *i*. They are pressed down by means of a clamp, I, and thumb screw, K.

When the reel arms are made of wood or other material which cannot be bent easily, their shape is somewhat modified and they may be made as represented in Fig. 2, wherein, L, represents the reel arms which are provided with slots, *m*, so that they may slide past the shank of the spindle and which are halved together so that their shanks can be slipped over each other whereby the arms are extended or contracted. They are also set within two clamping plates, *n*, and, *o*, and can be secured by means of the clamping screw M; N, represents pins, around which the skeins are hung and which can be stuck into any of the holes, 1; 2, 3, the same characteristics pervading both forms.

The operation of this apparatus is as follows: The arms being swung out at right angles to each other and the skeins being placed on the reel arms, the latter are extended until the thread is sufficiently tight as not to become entangled, when it can easily be spooled in the usual well known manner. The spring, *d*, prevents the reel arms from turning faster than the thread is wound on the spool acting as a check or brake on them and preventing the thread from becoming entangled, it also serves the purpose of holding the spindle, C, within its bearings as said spindle is not held at its lower end by a screw nut, shoulder or any other device, as such a device would tend to cramp the spindle and to press it so hard against its bearings when the thumb screw K is tightened as to prevent a free motion of the reel arms.

Having thus fully described the nature of our invention we would state that we do not broadly claim extension arms on a silk reel as this is not new, but—

What we do claim therein as new and desire to secure by Letters Patent is—

Securing the slotted arms of a silk reel to the spindle on which they turn in such a manner, as that they can be extended and contracted at pleasure and folded up parallel to each other and so that they can be rigidly secured to each other and to the spindle in any desired position, by means of a thumb screw, without preventing the spindle from freely turning in its bearings, substantially in the manner and for the purpose herein described.

S. W. PALMER.
J. F. PALMER.

Witnesses:
CHAS. H. JENKINS,
HORACE T. COOK.